(12) United States Patent
Graves et al.

(10) Patent No.: US 7,840,902 B2
(45) Date of Patent: *Nov. 23, 2010

(54) METHOD AND AN APPARATUS FOR AUTOMATIC CREATION OF SECURE CONNECTIONS BETWEEN SEGMENTED RESOURCE FARMS IN A UTILITY COMPUTING ENVIRONMENT

(75) Inventors: David Andrew Graves, Monte Sereno, CA (US); Philip John Day, Inkpen (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 673 days.

This patent is subject to a terminal disclaimer.

(21) Appl. No.: 11/260,511

(22) Filed: Oct. 26, 2005

(65) Prior Publication Data

US 2007/0094370 A1    Apr. 26, 2007

(51) Int. Cl.
*G06F 3/00* (2006.01)
*G06F 15/177* (2006.01)
(52) U.S. Cl. .................. 715/741; 715/733; 715/734; 709/220
(58) Field of Classification Search ......... 715/734–747, 715/733, 751–759, 750; 709/220–226
See application file for complete search history.

(56) References Cited

U.S. PATENT DOCUMENTS

| | | | | |
|---|---|---|---|---|
| 5,394,522 A | * | 2/1995 | Sanchez-Frank et al. .... | 715/735 |
| 5,751,965 A | * | 5/1998 | Mayo et al. ................. | 709/224 |
| 5,768,519 A | * | 6/1998 | Swift et al. ................. | 709/223 |
| 5,821,937 A | * | 10/1998 | Tonelli et al. ............... | 715/853 |
| 5,831,610 A | * | 11/1998 | Tonelli et al. ............... | 715/735 |
| 6,009,466 A | * | 12/1999 | Axberg et al. ............... | 709/220 |
| 6,054,987 A | * | 4/2000 | Richardson ................. | 715/734 |
| 6,078,990 A | * | 6/2000 | Frazier ........................ | 711/114 |
| 6,167,052 A | * | 12/2000 | McNeill et al. ............. | 370/399 |
| 6,271,845 B1 | * | 8/2001 | Richardson ................. | 715/764 |
| 6,314,460 B1 | * | 11/2001 | Knight et al. ............... | 709/220 |
| 6,654,803 B1 | * | 11/2003 | Rochford et al. ............ | 709/224 |
| 6,681,232 B1 | * | 1/2004 | Sistanizadeh et al. ..... | 707/104.1 |
| 6,697,087 B1 | * | 2/2004 | Kelly ........................... | 715/735 |
| 6,839,747 B1 | * | 1/2005 | Blumenau et al. ........... | 709/223 |
| 6,839,878 B1 | * | 1/2005 | Icken et al. ................. | 715/234 |
| 6,903,755 B1 | * | 6/2005 | Pugaczewski et al. ....... | 715/735 |
| 6,952,208 B1 | * | 10/2005 | Arquie et al. ............... | 345/440 |
| 7,039,870 B2 | * | 5/2006 | Takaoka et al. ............. | 715/736 |
| 7,093,005 B2 | * | 8/2006 | Patterson .................... | 709/220 |
| 7,107,534 B1 | * | 9/2006 | de Jong et al. .............. | 715/734 |
| 7,310,666 B2 | * | 12/2007 | Benfield et al. ............. | 709/223 |
| 2002/0002606 A1 | * | 1/2002 | Jaffe ........................... | 709/223 |
| 2002/0052941 A1 | * | 5/2002 | Patterson .................... | 709/223 |
| 2002/0103884 A1 | * | 8/2002 | Duursma et al. ........... | 709/219 |
| 2002/0103889 A1 | * | 8/2002 | Markson et al. ............ | 709/223 |
| 2002/0135610 A1 | * | 9/2002 | Ootani et al. ............... | 345/734 |
| 2002/0138572 A1 | * | 9/2002 | Delany et al. ............... | 709/204 |
| 2003/0009547 A1 | * | 1/2003 | Benfield et al. ............. | 709/223 |

(Continued)

*Primary Examiner*—Weilun Lo
*Assistant Examiner*—William Wong

(57) ABSTRACT

The present invention provides a method and an apparatus for automatic creation of secure connections between segmented resource farms in a utility computing environment. According to one embodiment, farms are automatically created using visual representations of the farms as a specification. A shared subnet is created as the basis of a secure connection, visual representations of one or more farms are associated with the shared subnet to form the secure connection between the one or more farms.

21 Claims, 9 Drawing Sheets

U.S. PATENT DOCUMENTS

| | | | |
|---|---|---|---|
| 2003/0028624 A1* | 2/2003 | Hasan et al. | 709/220 |
| 2003/0085914 A1* | 5/2003 | Takaoka et al. | 345/734 |
| 2003/0093509 A1* | 5/2003 | Li et al. | 709/223 |
| 2003/0103077 A1* | 6/2003 | Despotidis et al. | 345/734 |
| 2003/0131108 A1* | 7/2003 | Kagami et al. | 709/226 |
| 2003/0154279 A1* | 8/2003 | Aziz | 709/225 |
| 2003/0172145 A1* | 9/2003 | Nguyen | 709/223 |
| 2003/0234808 A1* | 12/2003 | Huang et al. | 345/735 |
| 2004/0093397 A1* | 5/2004 | Chiroglazov et al. | 709/219 |
| 2004/0098391 A1* | 5/2004 | Robertson et al. | 707/10 |
| 2004/0143658 A1* | 7/2004 | Newton et al. | 709/224 |
| 2004/0184412 A1* | 9/2004 | Stephenson et al. | 370/254 |
| 2005/0018668 A1* | 1/2005 | Cheriton | 370/389 |
| 2005/0044502 A1* | 2/2005 | Fu | 715/734 |
| 2005/0097440 A1* | 5/2005 | Lusk et al. | 715/500.1 |
| 2005/0138413 A1* | 6/2005 | Lippmann et al. | 713/201 |
| 2006/0015935 A1* | 1/2006 | Dixon et al. | 726/11 |
| 2006/0048075 A1* | 3/2006 | Kim | 715/840 |
| 2006/0090136 A1* | 4/2006 | Miller et al. | 715/734 |
| 2007/0094371 A1* | 4/2007 | Graves et al. | 709/223 |

* cited by examiner

METHOD AND AN APPARATUS FOR AUTOMATIC CREATION OF SECURE CONNECTIONS BETWEEN SEGMENTED RESOURCE FARMS IN A UTILITY COMPUTING ENVIRONMENT

TECHNICAL FIELD

Embodiments of the present invention relate to designing farms of information systems resources. More specifically, embodiments of the present invention relate to automatic creation of secure connections between farms in a utility computing environment.

BACKGROUND ART

Companies have data centers with information system's resources, such as servers, storage devices, firewalls, routers, network backbones, etc., that are used for executing applications. Typically, farms of resources are created by deploying resources to the farms for executing a particular type of application or suite of applications, such as an application or applications for a billing department. Application designers design conventional farms manually, which is difficult, time consuming, and prone to error.

FIG. 1 is a diagram of a conventional farm. The conventional farm 100 includes networking subnets 105 and computational servers 110 that are used to execute different parts of an application. The different parts of the application may be what are commonly known as "layers" of an application. For example, an application may have a web access layer 120, a presentation layer 130, an application layer 140, among other things. Different administrators are typically responsible for the different parts of the farm. For example, a first administrator may be responsible for the part of the farm that executes the web access layer 120, a second administrator may be responsible for the part of the farm that executes the presentation layer 130 and a third administrator may be responsible for the part of the farm that executes the application layer 140. However, with conventional farms 100, all three of the administrators have access to all parts of the farm. Continuing the example, the first, second and third administrators would have access to all parts of the conventional farm 100 regardless of which layer 120, 130, 140 of the application executes on a part of the conventional farm 100.

For these and other reasons, there is a need for a way to design farms that is easy, that is efficient, that reduces the probability of errors in the design, or that addresses security issues.

DISCLOSURE OF THE INVENTION

The present invention provides a method and an apparatus for automatic creation of secure connections between segmented resource farms in a utility computing environment. According to one embodiment, the automatic creation of farms using visual representations of the farms as a specification is enabled. Further, the creation of a shared subnet as the basis of a secure connection is enabled. Additionally, the association of visual representations of farms with the shared subnet to form the secure connection between the farms is enabled.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
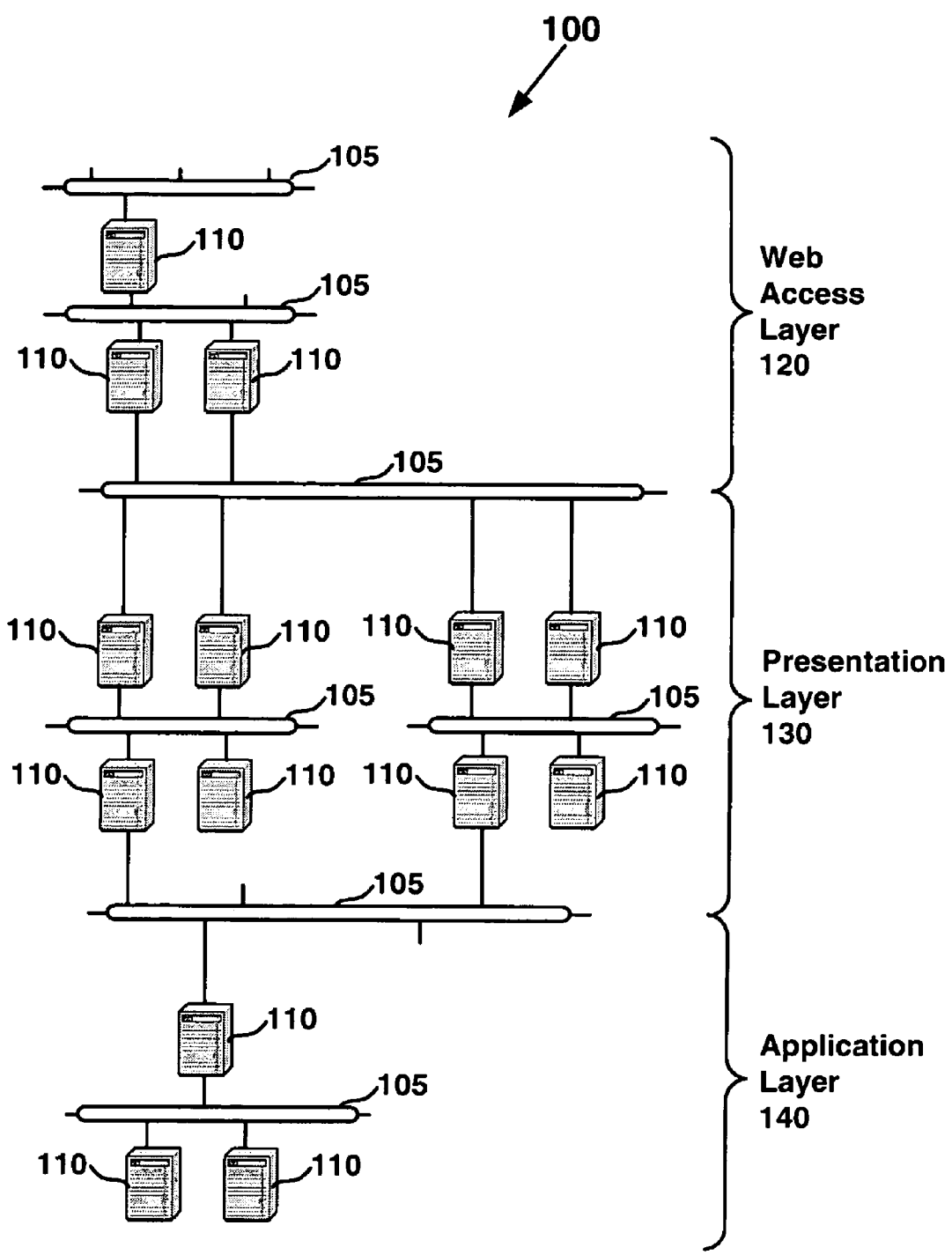
FIG. 1 is a diagram of a conventional farm (Prior Art).

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

SOFTWARE SYSTEM AND FUNCTIONAL OVERVIEWS

According to one embodiment, a development tool is provided for creating visual representations of farms and visual representations of secure connections between the farms. The development tool provides a way to design farms that is easy, that is efficient, and that reduces the probability of errors in the design, as will become more evident, according to one embodiment.

The visual representations of the farms and of the secure connections are used to create farms and the secure connections between them, for example, by using a utility controller, according to yet another embodiment. For example, the utility controller can receive a specification with the visual representations and create the farms and secure connections based on the specification of the visual representations.

According to another embodiment, the development tool can be used for subdividing farms into smaller farms. For example, a conventional farm (FIG. 1) that executes a web access layer 120, a presentation layer 130, and an application layer 140 may be broken into three different farms that correspond to each of the three layers 120, 130, 140. Administrators are allowed access only to the subdivided farms that they need to administrator or know about, according to another embodiment. Thus, the development tool addresses security issues, as will become more evident, according to one embodiment.

According to yet another embodiment, visual representations of farms and visual representations of secure connections between the farms can be reused. For example, the visual representations can be stored in a repository. An application designer can search the repository for visual representations that will work for whatever application or part of an application they are currently designing. More specifically, if the application designer is designing a web access layer 120, the application designer can search the repository for visual representations for farms that a web access layer 120 could execute on. A repository also provides a way to design farms that is easy, that is efficient, and that reduces probability of errors in the design, as will become more evident, according to one embodiment.

The development tool also facilitates structured design of farms, according to one embodiment, because the development tool allows for designing visual representations of farms according to the function that the farm would provide. For example, the development tool can be used for creating a visual representation of a farm that would be used for executing a functional part of an application, such as a layer or a part of a layer. The development tool also facilitates structured design of farms because the visual representations can be reused, as described herein.

Visual representations of farms and of secure connections can also be used for mirroring farms which allows for maintaining applications, increases the reliability of applications, and provides a way to recover from resource failures, as will become more evident, according to yet another embodiment.

RESOURCES

Resources can be any component that is hardware, software, firmware, or combination thereof that can be used by a data center to provide services rendered by an application, as will become more evident. For example, the resources can be computational servers, firewalls, load balancers, data backup devices, arrays of data storage disks, network appliances, Virtual Local Area Networks (VLANS), and network interface cards (NICs), among other things.

FARMS

A "farm" can be created from one or more resources. For example, resources can be automatically deployed from a pool of resources to create a farm. For example, a farm can include various resources, such as a network backbone, firewalls, a cluster of servers and storage devices. The network backbone allows the farm to communicate with the rest of the resources associated with a data center. Applications can be installed and executed on the clusters of servers. Data that the applications create or use can be stored on the storage devices. The firewalls can be used for protecting the applications on the clusters and the data on storage devices. The resources associated with a farm are typically networked together using a network map.

As already stated, conventional farms for executing applications on can be very large. According to one embodiment, a conventional farm 100 (FIG. 1) can be divided into several smaller farms that are securely connected to each other. For example, applications frequently have layers. More specifically, an application can have a web access layer, a presentation layer, an application server layer, a business logic layer or a database layer. The layers of the application can form horizontal layers that form a hierarchy of layers. For example, an application may have three layers in the order of a web access layer 120, a presentation layer 130, and an application layer 140.

Figure 2:
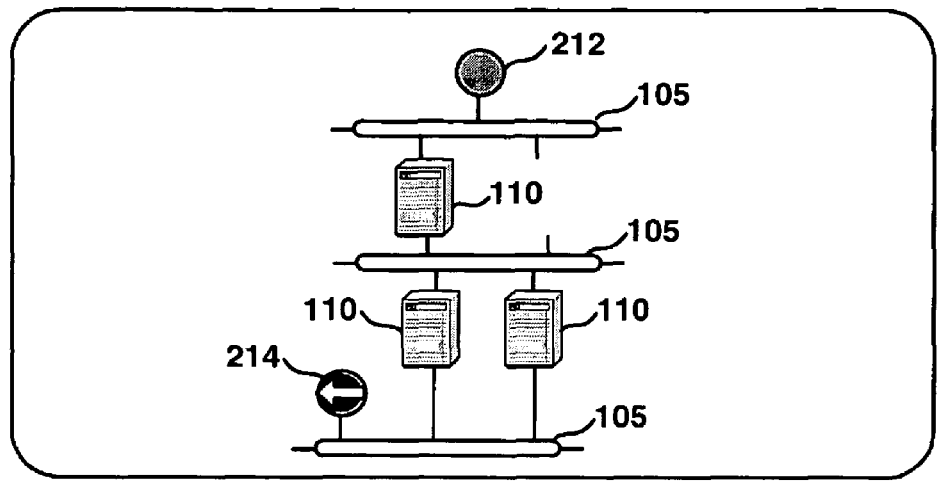
FIG. 2 is a diagram of farms and secure connections between the farms, according to embodiments of the present invention.
Figure 2:
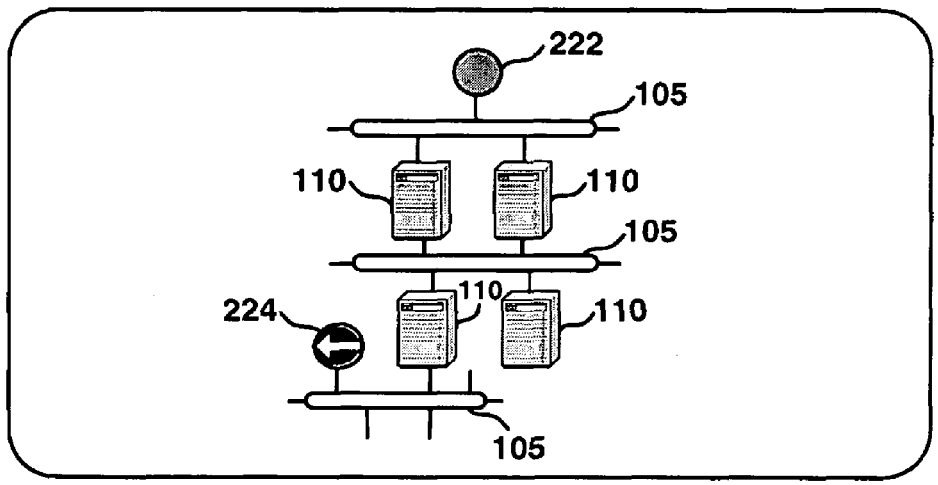
Figure 2:
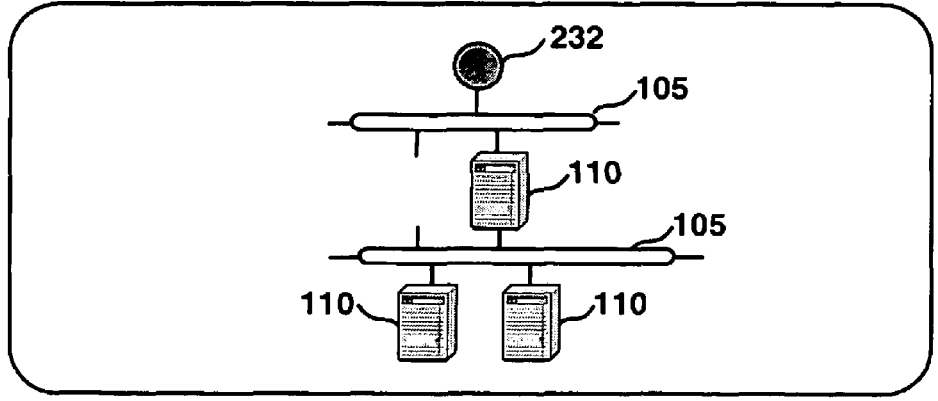

The layers 120, 130, 140 are used for determining how to divide a conventional farm 100 (FIG. 1), according to one embodiment. FIG. 2 is a diagram of farms and secure connections between the farms, according to embodiments of the present invention. Various resources 110 are associated with each of the layers 120, 130, 140 of an application. A conventional farm 100 can be subdivided into smaller farms 210, 220, 230. For example, one farm 210 can be created from the resources associated with a web access layer 120, a second farm 220 can be created from the resources associated with a presentation layer 130, and a third farm 230 can be created from the resources associated with an application layer 140. The layers 120, 130, 140 can be interlinked with each other in order to communicate. Continuing the example of the application with horizontal layers, the farm 210 for the web access layer 120 and the farm 220 for the presentation layer 130 can be interlinked and can communicate with each other. The farm 220 for the presentation layer 130 and the farm 230 for the application layer 140 can be interlinked and can communicate with each other.

One or more farms 210, 220, 230 that were created based on the layers 120, 130, 140 can be further subdivided to create even more smaller farms. For example, an application designer can perform additional analysis on the farms 210, 220, 230 based on the types of services provided by the parts of the application associated with each layer 120, 130, 140 and determine to further divide the farms 210, 220, 230.

As already stated, with conventional farm 100 (FIG. 1) administrators can access any part of the conventional farm. By dividing a conventional farm 100 into smaller farms 210, 220, 230 (FIG. 2), different administrators can be assigned to work on the different farms 210, 220, 230 that resulted from dividing up the larger conventional farm 100 (FIG. 1). Continuing the example, referring to FIG. 1, the first layer of the conventional farm 100 may be a web access layer 120, the second layer may be a presentation layer 130, and the third layer may be an application layer 140. An administrator David may be responsible for the web access layer 120, administrator Cheryl may be responsible for the presentation layer 130, administrator John may be responsible for the application layer 140, and designer Mike may have overall responsibilities for the entire conventional farm 100

However with a conventional farm 100 all of the administrators have access to all of the resources 110 associated with the conventional farm 100. For example, David, Cheryl, John, and Mike would have access to all of the resources 110 that associated with the conventional farm 100. In contrast, according to embodiments of the present invention, administrators are allowed access only to the subdivided farms that they need to administrator or know about, according to another embodiment. For example, referring to FIG. 2, David may only have access to the farm 210, Cheryl may only have access to farm 220, and so on. Further, the administrators, such as David and Cheryl, may selectively authorize other administrators to design farms that can connect to their own farms. For example, David may authorize Cheryl to design farms that can connect to a particular subnet of farm 210 but not authorize John to design farms that can connect to farm 210, as will become more evident.

Therefore, according to rules of good security, administrators only know about and have access to those resources that they need to know about and have access to. This is commonly referred to as "minimum privilege," which reduces the likelihood of illegal activities by any administrator. According to embodiments of the present invention, the principle of minimum privilege is used since administrators only have access to the farms that they are responsible for or that they have been granted access to as will become more evident.

SECURE CONNECTIONS

According to another embodiment, secure connections are used for providing secure communications between farms. For example, two farms 210, 220 may communicate over a secure connection where one end 214 of the connection is associated with one of the farms 210 and another end 222 of the secure connection is associated with the other farm 220. At one end 214 of the secure connection communications can exit a farm 210 and at the other end 222 of the secure connection communications can enter another farm 220. Similarly, communications can flow in the other direction. For example, communications can exit farm 220 at the end 222 of a secure connection and enter farm 210 at the other end 214 of the same secure connection. Secure connections and flow of communications can also be provided between farms 220 and 230.

FIG. 2 depicts two secure connections, according to one embodiment. One secure connection is represented by the two ends 214, 222 of the secure connection associated with the two farms 210, 220. A second secure connection is represented by the two ends 224, 232 of the secure connection associated with the two farms 220 and 230. In another embodiment of the present invention, all access lists for all ends of secure connections are created only by a supervising administrator who uses a connection definer associated with a utility controller, as will become more evident, to record a subnet name and a list of administrators who are authorized to create farm designs that can connect to that subnet.

By enabling communications to flow between the ends, such as ends 214 and 222, associated with the secure connection between farms, such as farms 210 and 220, a single LAN segment can be used for the two farms 210 and 220, according to one embodiment. For example, a single VLAN can be allocated to both farms 210, 220, thus, avoiding the need for routing the network traffic in a more complex way.

According to one embodiment of the present invention, the same identifier can be associated with the two ends of a secure connection. For example, the same subnet name, such as "subnet1," can be used to identify the two ends of a secure connection. Similarly, the same subnet name "subnet2" can be used to identify the two ends of another secure connection, as will become more evident.

Although many of the examples provided herein describe a particular secure connection between two farms, according to embodiments of the present invention, a particular secure connection can be used between multiple farms.

ACCESS LISTS

According to another embodiment, a list of administrators that can access farms (referred to herein as an "access list") is associated with a secure connection between the farms. According to yet another embodiment, each secure connection end has exactly one access list. Continuing the example, administrator David can allow administrator Cheryl to design farms that may connect to farm 210 at the end 214 of the secure connection associated with farm 210. Therefore, the access list for the connection end 214 in farm 210 would include David, the administrator of farm 220, and Cheryl, who has been authorized by David to access the subnet at the connection end 214. Similarly, administrator Cheryl can allow administrator David to design farms that may connect to farm 220 at the other end 222 of the same secure connection. Therefore the access list for the connection end 222 in farm 220 would include Cheryl, the administrator of farm 220, and David, who has been authorized by Cheryl to access the subnet at the connection end 222.

In this case, the access list for connection ends 214 and 222 would identify the same administrators as having access to the connection ends 214 and 222, thus, preventing unknown administrators from designing farms that may connect to the farms 210, 220. For example, when the visual representations of the farms 210, 220 and the secure connection are used to create the farms 210, 220 and to securely connect the farms 210, 220 to each other, the access lists associated with the two ends of the secure connection can be compared before the secure connection is established, according to one embodiment, as will become more evident.

By providing access lists, the administrators can share work on farms while at the same time limiting the access that administrators have to the farms. Continuing the example, David can use an access list to authorize Cheryl to design farms that may connect to connection end 214 in farm 210. In this case, David and Cheryl can share work on farm 210. But at the same time, David may not authorize John to access connection end 214 in farm 210, thus limiting access to farm 210.

If the same administrators are not specified in the two access lists, then the secure connection is not established, according to another embodiment. For example, if administrators David and Cheryl both agreed to allow each other to have access to connection ends 214 and 222 in each other's farms but then Cheryl allowed administrator John to have access to connection end 222 in farm 220, then potentially administrator John can design farms that can connect to farm 210 without David's permission. However, since according to embodiments of the present invention, the secure connection is not established if the same administrators are not specified in the two access lists, then John will be prevented from accessing farm 210 without David's authorization.

According to one embodiment, a user interface associated with a development tool can be used for configuring access lists. For example, a user interface can include a field for entering a subnet name associated with the secure connection and a drop down menu (referred to as the "access list menu") for selecting which administrators will be granted access to the secure connection. Continuing the example of one end 214 of the secure connection associated with farm 210. In this case, David may enter "subnet1" into the subnet name field, select Cheryl from the drop down menu.

Although the embodiments have been described with regards to establishing a secure connection with access lists that are the same for both ends of the secure connection, access lists that are symmetrical shall be considered to be the same. For example, David is the administrator for farm 210 and Cheryl is the administrator for farm 220. If the access list for the end 214 of secure connection associated with farm 210 only specifies Cheryl and the access list for the other end 222 of the secure connection associated with farm 220 only specifies David, then the access lists are symmetrical since David is the administrator of farm 210 and Cheryl is the administrator of farm 220. Such symmetrical access lists are considered to be the "same," according to embodiments of the present invention.

VISUAL REPRESENTATIONS OF FARMS

Figure 3A:
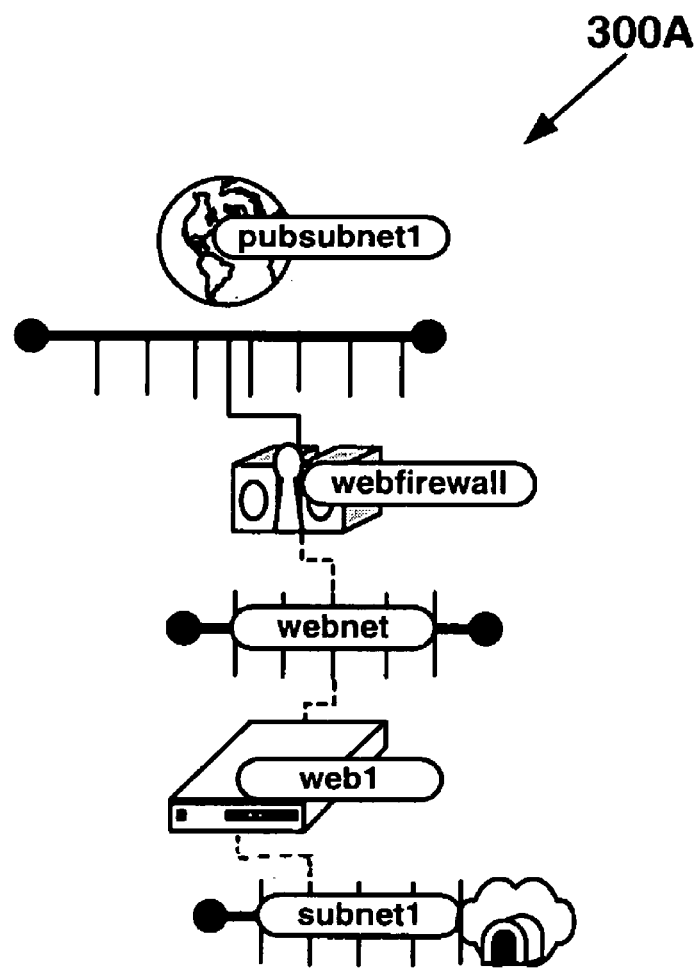
FIGS. 3A and 3B depict visual representations of farms and visual representations of secure connections between the farms, according to embodiments of the present invention.
Figure 3B:
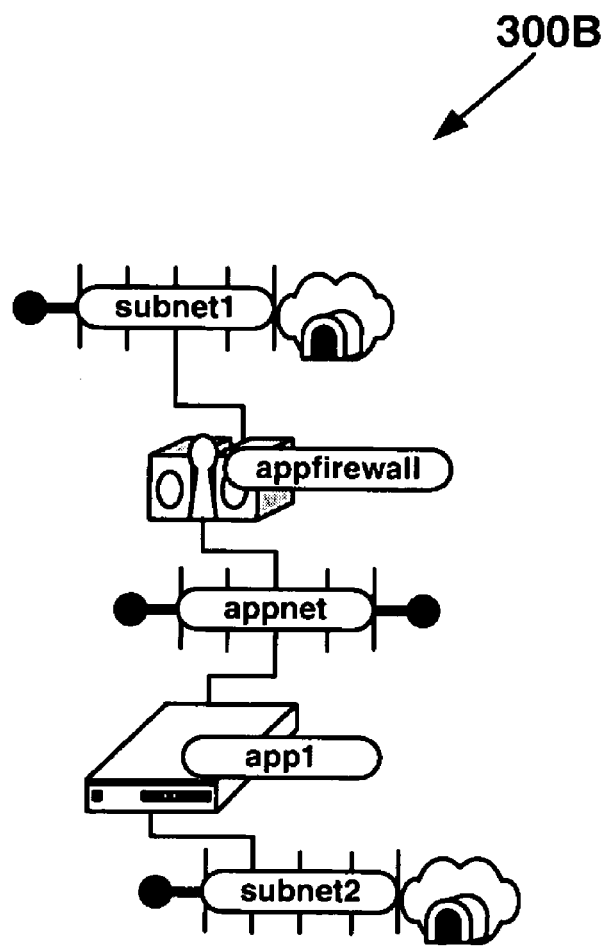

FIGS. 3A and 3B depict visual representations of farms and visual representations of secure connections between the farms, according to embodiments of the present invention. The visual representations of the farms include visual representations of resources associated with the farms. For example, the visual representation of farm 300A depicted in FIG. 3A includes visual representations of resources "pubsubnet1," "webfirewall," "webnet," "web1," "subnet1." FIG. 3B depicts a visual representation of farm 300B with visual representations of resources "subnet1," "appfirewall," "appnet," "app1," and "subnet2." The visual representation "pubsubnet1" represents an external network such as the Internet or an external network backbone.

Further, the visual representations of farms include visual representations of how the resources should be interconnected. For example, the visual representation of farm 300A as depicted in FIG. 3A includes a visual representation indicating that "pubsubnet1" is connected to "webfirewall," that "webfirewall," is connected to "webnet," and that "webnet," is connected to "web1," and that "web1" is connected to "subnet1."

VISUAL REPRESENTATIONS OF SECURE CONNECTIONS

FIGS. 3A and 3B also depict visual representations of secure connections, according to one embodiment. For example, the visual representation of "subnet1" depicted on FIG. 3A represents one end of a secure connection. The visual representation of "subnet1" depicted on FIG. 3B represents the other end of the same secure connection, as will become more evident. The visual representation of "subnet2" depicted on FIG. 3B represents one end of another secure connection, as will become more evident. According to one embodiment, the visual representations of resources are icons.

The ends of a secure connection can be depicted as the ends of a tunnel, according to one embodiment. More specifically, FIGS. 3A and 3B depicts an end of a tunnel for "subnet1" and FIG. 3B depicts the other end of the tunnel for "subnet1." FIG. 3B additionally depicts one end of a tunnel for "subnet2."

According to one embodiment, referring to FIG. 3A, communications can flow from the network backbone as represented by "pubsubnet1" through farm 300A to "subnet1" at the bottom of farm 300A, to the top of "subnet1" at the top of farm 300B (referring to FIG. 3B), through farm 300B and out "subnet2." Similarly, communications can flow in the other direction starting with "subnet2," (referring to FIG. 3B) through "subnet1" (referring to FIG. 3B and 3A) and ultimately out "pubsubnet1" (referring to FIG. 3A).

As already described herein, the same virtual local area network (VLAN) or subnet can be used for the farms. In this case, visual representations of secure connections between two farms would indicate that the visual representations of the farms and the associated secure connections should be used to create the two farms on the same VLAN or subnet. For example, FIG. 3A depicts one end of a secure connection "subnet1" and FIG. 3B depicts the other end of the same secure connection for "subnet1," thus indicating that farm 300A and farm 300B can access the same network subnet, named "subnet1."

The visual representations of farms represent parts of a conventional farm, according to an embodiment, as already described herein. For example, farm 300A and farm 300B depicted in FIGS. 3A and 3B may represent a web access layer 120, a presentation layer 130, an application layer 140, or a part of a layer 120, 130, 140.

A diagram as depicted in FIG. 2 can also represent visual representations of resources, visual representations of farms and visual representations of secure communications between the farms, according to another embodiment. Visual representations of secure connections can also be depicted as arrow images and as world images. For example, referring to FIG. 2, one end 214 of a secure connection between farm 210 and farm 220 is depicted as an arrow image and the other end 222 of the same secure connection is depicted as a world image. The images can be icons, according to another embodiment Visual representations of secure connections can be considered as a part of visual representations of farms that they connect, according to one embodiment. According to another embodiment, visual representations of secure connections are considered to be separate from the visual representations of the farms that they connect.

DEVELOPMENTAL TOOL

As already stated herein, frequently conventional farms are created manually. Further, there are prior art visual rendering tools for creating visual representations of farms. However, according to embodiments of the present invention, an enhanced development tool allows visual representations of farms than can be securely connected, for example, by introducing a secure connecting subnet with associated access control provided by access lists as described herein. The enhanced development tool, provided by embodiments of the present invention, significantly reduces the amount of time and money to create farms, among other things.

Figures 4A, 4B:
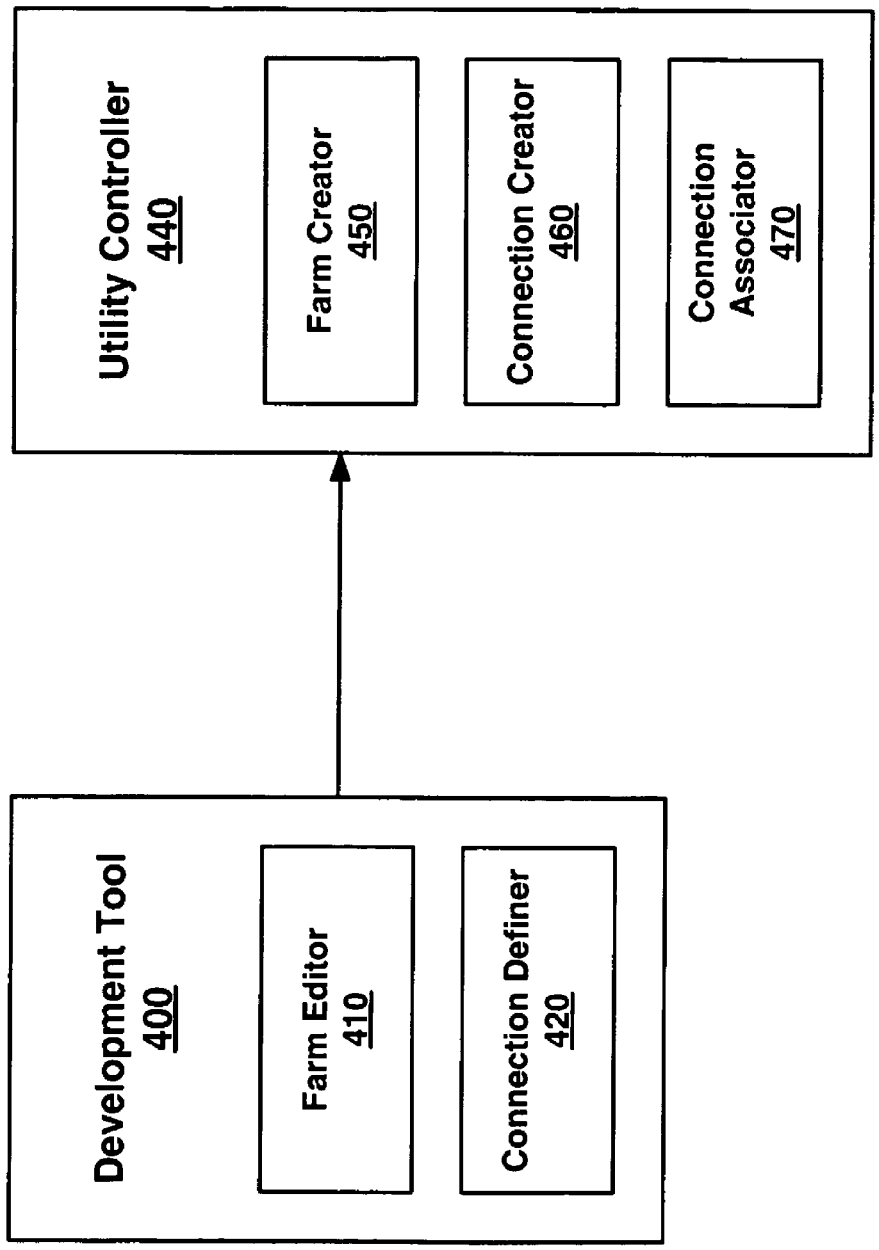
FIG. 4A is a block diagram of a developmental tool that can be used for creating visual representations of farms and visual representations of secure connections between the farms, according to embodiments of the present invention.
FIG. 4B is a block diagram of an apparatus for automatic creation of secure connections between segmented resource farms in a utility computing environment, according to embodiments of the present invention.

FIG. 4A is a block diagram of a developmental tool that can be used for creating visual representations of farms and visual representations of secure connections between the farms, according to embodiments of the present invention. For example, the development tool can provide a user interface for creating a visual representation of a farm. The user interface can be used to indicate which resources a user (e.g., a designer) wanted to associate with a farm. More specifically, the user interface can be used for dragging and dropping visual representations of resources to associate those resources with a farm 300A (FIG. 3A).

Further, the user interface can be used to create visual representations of connections between the resources. The user interface can be used to indicate how the user wanted the resources associated with the farm to be connected. More specifically referring to FIG. 3A, the user can click on one resource, such as "webfirewall," and then click on another resource, such as "pubsubnet1," to indicate that the two resources "webfirewall" and "pubsubnet1" should be connected.

A farm editor 410 creates visual representations of farms, according to one embodiment. For example, the farm editor 410 can receive information indicating the user wanted to associate resources "pubsubnet1," "webfirewall," "webnet," "web1," and "subnet1" with a farm 300A (FIG. 3A) and information indicating how the user wanted the resources connected. The farm editor 410 can use the received information to create a visual representation of farm 300A, as depicted in FIG. 3A. Similar processing can be used to create visual representation of a farm 300B as depicted in FIG. 3B.

The development tool 400 can also be used to create visual representations of secure connections between the visual representations of the farms. For example, a user interface can be used to specify a visual representation of a secure connection, for example, by dragging and dropping a tunnel icon (FIG. 3A) onto a screen associated with the user interface. The user interface can also receive a name, such as "subnet1," that the user wants to associate with the visual representation of the secure connection, which is the tunnel icon in this case. The user interface can also be used to specify the gateway, where the subnet is allocated from, the mask, and the internet protocol, as already described herein.

A designer uses a connection definer 420 to create visual representations of ends of a secure connection, according to one embodiment. For example, the connection definer 420 can receive information indicating that the user (e.g., designer) caused the tunnel icon to be dragged and dropped onto a screen. Further, the connection definer 420 can receive information indicating that the user associated the name "subnet1" (FIG. 3A) with the visual representation of the secure connection, such as the tunnel icon for "subnet1." The connection definer 420 uses the received information to create the visual representations of the secure connection as represented by the tunnel icons "subnet1" depicted on FIG. 3A or FIG. 3B.

According to one embodiment, the connection definer 420 can be used to associate an access list with each end of a visual representation of a secure connection. For example, a user (e.g., designer) can use a pull-down menu to indicate that certain administrators are to be associated with a particular visual representation of an end of a secure connection, as already described herein, into the development tool 400. Unique identifiers can be used for indicating the administrators. The connection definer 420 use unique identifiers to create an access list for each visual representation of a secure connection. In one embodiment, the designer indicates the unique identifier of one or more other designers via a pull-down menu. The set of unique identifiers of designers forms the access list for a particular end of a secure connection, according to one embodiment.

Thus, a development tool 400 can be used to define what resources are to be associated with farms and how the resources are to be connected. In so doing, the visual representations of the farms and the visual representations of the secure connections between the farms define how communications between and within farms can be performed. Further, an application system can be created using visual representations of farms and the visual representations of the secure connections, as will become more evident.

A development tool 400 for creating visual representations of farms and secure connections is also used for specifying what operating system, what tunable variables for system performance and what system behavior, as well as what application software, are to be associated with various resources of a farm, according to another embodiment.

UTILITY CONTROLLER

As already stated, a "farm" can be created from one or more resources. A utility controller can automatically deploy one or more resources from a pool of resources to create a farm. For example, a utility controller can receive a specification of the visual representations of farms and visual representations of secure connections. The utility controller can use the visual representations of the farms associated with the specification to determine how to automatically create the farms. Further, the utility controller can use the visual representations of secure connections associated with the specification to determine how to securely connect the farms.

FIG. 4B is a block diagram of an apparatus for automatic creation of secure connections between segmented resource farms in a utility computing environment, according to embodiments of the present invention. As depicted in FIG. 4B, the utility controller includes a farm creator 450, a connection creator 460, and a connection associator 470. The utility controller 440 receives visual representations of farms and visual representations of secure connections between the farms as depicted in FIGS. 3A and 3B, according to one embodiment. The farm creator 450 associated with the utility controller 440 can use the visual representations to determine what resources to obtain from a pool of resources and then use those resources to create the farms and the connections between the farms (also commonly referred to as assigning resources to a farm, deploying resources, or deploying farms), according to another embodiment.

More specifically, the farm creator 450 can use the visual representations of farms and of secure connections, such as those depicted in FIGS. 2, 3A and 3B, to determine how to create farms. For example, a utility controller can use the visual representations depicted in FIG. 3A to determine that resources (as represented "pubsubnet1," "webfirewall," "webnet," "web1") are to be assigned to farm 300A and to determine that "pubsubnet1" is connected to "webfirewall," that "webfirewall" is connected to "webnet," that "webnet" is connected to "web1," and "web1" is connected to "subnet1." The farm creator 450 can use similar processing to create farm 300B using the visual representations ("subnet1," "appfirewall," "appnet," "app1", "subnet2") depicted in FIG. 3B.

The connection creator 460 can use a visual representation of a secure connection, such as the ends of the secure connection "subnet1" where one end of the secure connection "subnet1" is depicted on FIG. 3A and the other end of the secure connection "subnet1" is depicted on FIG. 3B.

The connection associator 470 associated with the utility controller 450 uses identifiers, such as subnet name "subnet1," associated with secure connections to determine what farms are to be securely connected to each other, as already described herein, according to one embodiment. For example, the connection associator 470 can determine the shared subnet "subnet1" is associated with both the visual representations of farm 300A and 300B and therefore the shared subnet "subnet1" should be used to form the secure connection between farm 300A and 300B.

Further, the connection associator 470 uses access lists associated with the secure connections to determine whether the secure connections can be established, as already described herein, according to another embodiment. As previously discussed with regards to FIG. 2, administrator David configured one end 214 of a visual representation of a secure connection with an access list to specify administrator Cheryl. Similarly, administrator Cheryl configured the other end 222 of the visual representation of the secure connection with an access list to specify administrator David. In so doing, both access lists specify Cheryl and David. The connection associator 470 can use the access lists associated with the two ends 214, 222 of the secure connection to determine whether the secure connection between farms 210 and 220 can be established.

By using visual representations of farms and visual representations of secure connections between the farms, application systems can be created. For example, an application may include a web access layer, a presentation layer, and an application layer that can be implemented on farms as represented by visual representations 210, 220, 230, 300A, 300B as depicted in FIG. 2. A utility controller 440 can use visual representations of farms 210, 220, 230, 300A, 300B and visual representations of the secure connections, similar to those depicted in FIGS. 3A and 3B, to create farms (as represented by visual representations 210, 220, 230, 300A, 300B) that an application can execute on.

DATA CENTER

Figure 5:
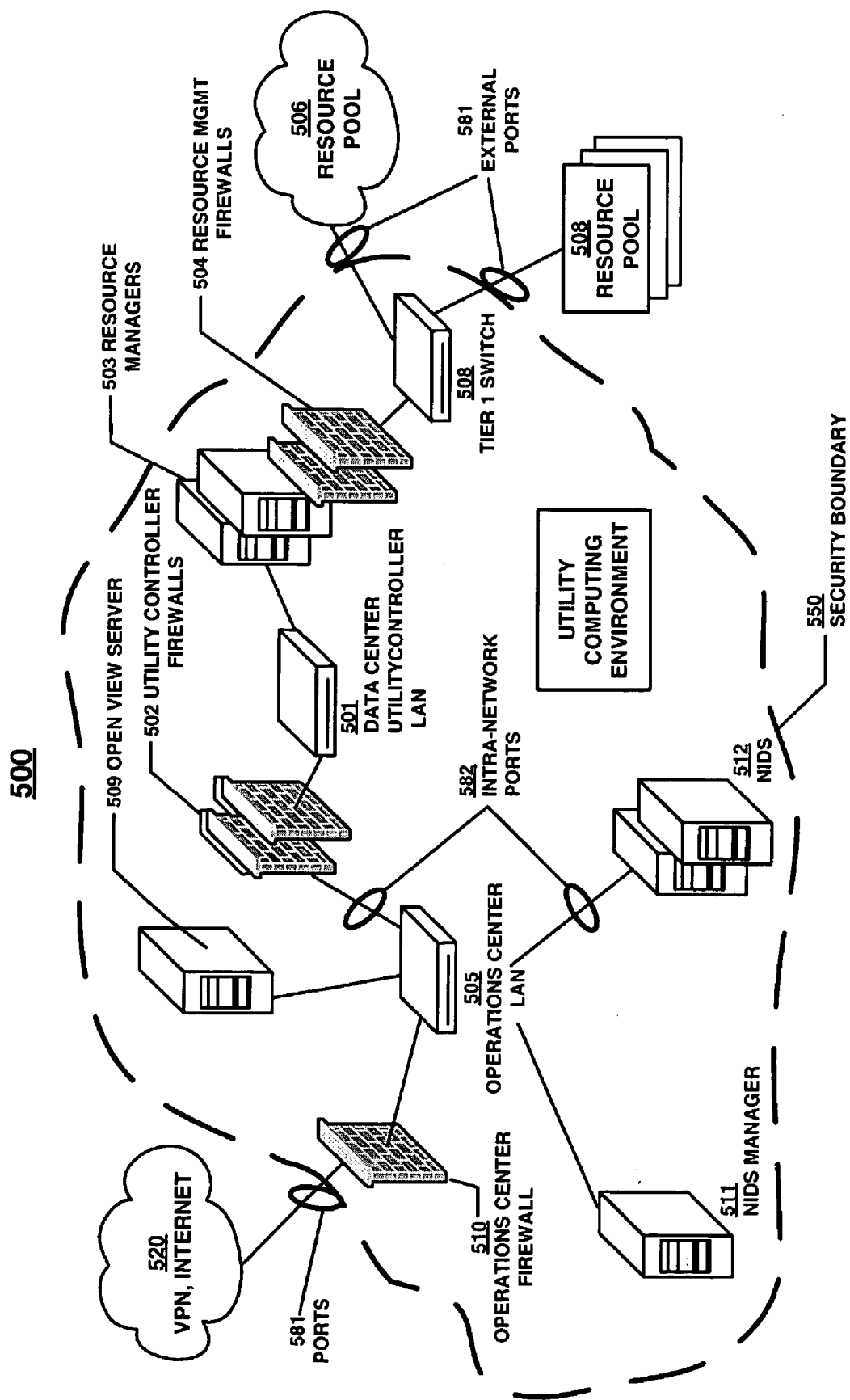
FIG. 5 is a block diagram of an exemplary utility computing environment, according to embodiments of the present invention.

As already stated, a utility controller, the resources that the utility controller provisions to create farms, applications that execute on the farms, etc. are elements of a data center. FIG. 5 is a block diagram of an exemplary utility computing environment, according to embodiments of the present invention. A data center, also known as a utility computing environment (UCE) 500 is shown bounded by a virtual security boundary 550. Boundary 550 is shown here only to help illuminate the concepts presented herein. Typical UCE 500 comprises an operations center local area network (LAN) 505, a data center UC LAN 501 and resource pools 506. According to one embodiment, resource pools 506 are an example of resource pool 210. It is noted here that, by their very nature, UCEs are flexible in their composition, comprising any number and type of devices and systems. It is this flexibility from which they derive their usefulness. The specific architecture illustrated in FIG. 5, therefore, is not meant to limit the application of embodiments of the present invention to any particular provisionable network architecture.

Typical UCE 500, in this illustration, communicates with the outside world via the Internet 520 and virtual public networks (VPNs) in the Internet. The communications links that enable this communication are protected by firewall 510. Firewall 510 is shown to illustrate a concept and is not meant to imply any particular method or system of intrusion protection. Many types of hardware and software firewalls are well known in the art and firewall 510 may be either or both.

It is noted here that communications into and out of a provisionable network, as in any network, is accomplished through ports such as illustrated at 581. Communications between devices within a network are also conducted through ports, as alluded to at 582. It is noted that ports are not necessarily physically located at the periphery of a network but are logical end points. External ports 581 and intra-network ports 582 are shown only to help illustrate the concepts presented in embodiments of the present invention. It is also noted that virtual security boundary 550 does not exist in a physical sense. Resources included in the servers and LANs comprising utility computing environment 500 may include devices and servers located remotely from the other elements of the UCE.

Embodiments of the present invention operate in an environment that distinguishes between three trust domains established in the trust hierarchy of a utility computing environment. One trust domain is embodied in the Operations Center (OC) LAN 505 where non-critical UCE and other operations-related functions reside. The level of trust is less than the Data Center Control LAN 501. Another trust domain is the data center controller LAN 501 where tasks relating to the automated provisioning of managed resources 506 reside. Access to the Data Center LAN 501 is severely restricted from this domain. A third domain comprises the managed resources LANs where the managed resources 506 reside. These LANs are typically not trusted. It is noted here that clients of the utility computing environment originate outside the above trust structure and access elements of the UCE via the Internet or a virtual private network (VPN) resident in the Internet infrastructure.

As shown in FIG. 5, operations center (OC) LAN 505 comprises an internal trust domain. Included in OC LAN 505 are manager-of-managers (MoM) server 509, network intrusion detection system (NIDS) 512 and NIDS manager 511. It is noted that, though NIDS 512, NIDS manager 511 are illustrated as computer-like devices, their physical existence is not limited to a particular device. Each may exist as a standalone device or implemented as software resident in a physical device or server.

The heart of the exemplary utility computing environment illustrated in FIG. 5 is the data center utility controller LAN, 501. This LAN represents another, higher, internal trust domain. UC LAN communicates through OC LAN 505 and is typically separated from it by various forms of firewalls 502. UC LAN 501 can comprise various numbers of resource managers, such as illustrated at 503. The flexibility inherent in the UCE concept can result in many combinations of resources and resource managers. Resource managers 503 are the typical interface with the various pools of resources 506, communicating with them through ports and some sort of switching network as indicated by the tier 1 switch at 508.

Resource pools 506 are limitlessly flexible, comprising any conceivable combination of provisionable resources, such as resource servers, data servers, computational capability, load balancing servers or any other device or capability imaginable. Because the possible varieties of resources that can be included in resource pools 506, they are separated from UC LAN 501 by firewalls 504, which, like UC firewalls 502, can be software or hardware or both, in many combinations.

REPOSITORY OF VISUAL REPRESENTATIONS

According to one embodiment, visual representations of farms can be reused. For example, when an application designer creates a visual representation of a farm, that visual representation can be stored in a repository (also commonly referred to as a "library"). More specifically, the application designer can create visual representations of farms that can be used for any layer or any part of a layer associated with an application, as described herein. At a later point in time, if an application designer needs to build an application system, the application designer can search the repository to see if there are any visual representations of farms that the application designer can use.

As already stated herein, conventional farms are created manually or via conventional visual representation tools and then automatically implemented by automation in a UCE. According to embodiments of the present invention, designers can break up (e.g., subdivide) overly large designs of farms into smaller, more modular designs that can be stored in a repository. The application designer may find visual representations of farms that they can use without any modifications or that can be used with modifications, thus, the complexity of designing farms is significantly reduced. In turn, significant amounts of time and money in creating farms is significantly reduced in comparison to conventional methods of creating farms. In fact, complex farms can be designed rapidly and less expensively in comparison to using conventional methods.

Further, reusing farms reduces the probability of errors, according to embodiments of the present invention. For example, reusing visual representations of farms promotes designing applications in a structured manner, which as is well known in the art, reduces the probability of errors and increases maintainability. Further, reusing visual representations of farms reduces the probability of errors since the farms created from the visual representations were probably tested before the visual representation of the farms were stored in a repository.

Visual representations of secure connections can also be reused, for example, by storing them in repositories for later use in a manner similar to that described with regards to visual representations of farms. Visual representations of secure connections can be stored in a repository separately or as a part of visual representations of farms they are associated with.

MIRRORED FARMS

As is well known in the art, mirroring devices, such as storage devices, can be used as a part of maintaining data stored on a storage device, as well as a part of disaster recovery and improving reliability. According to one embodiment, visual representations of farms can be mirrored. According to one embodiment, two farms that are mirror images of each other are the same, as will become evident.

Figure 6:
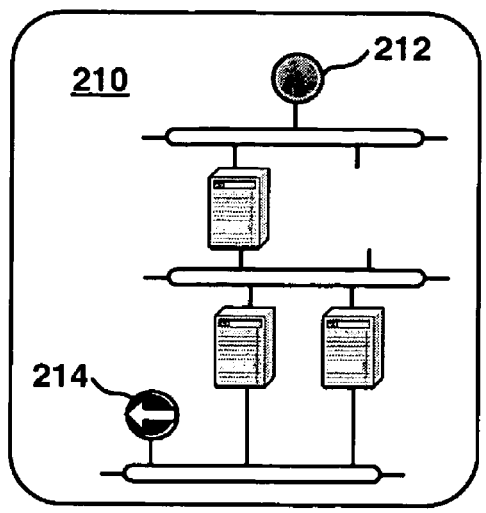
FIG. 6 is a block diagram of farms that have been mirrored, according to one embodiment of the present invention.
Figure 6:
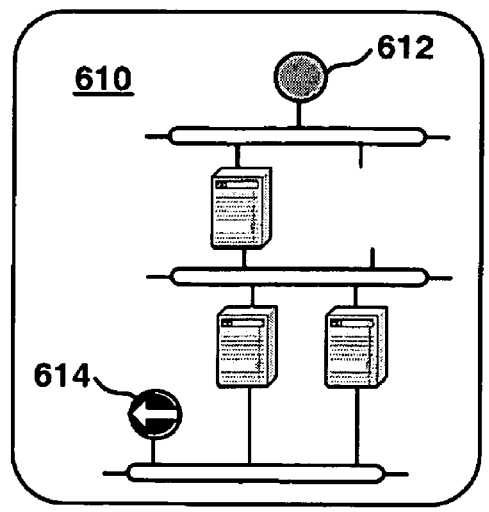
Figure 6:
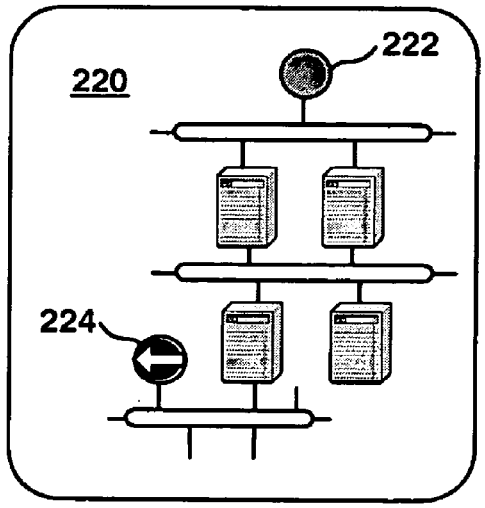
Figure 6:
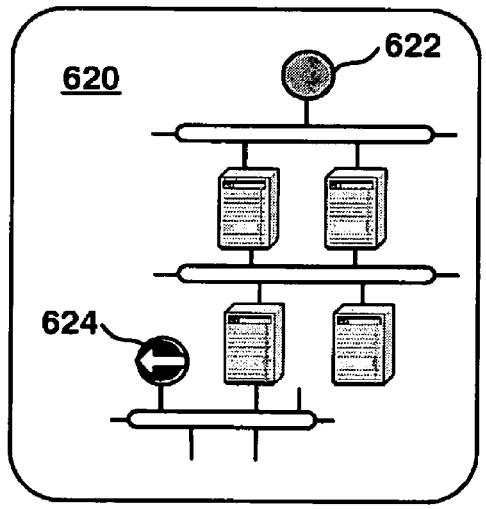
Figure 6:
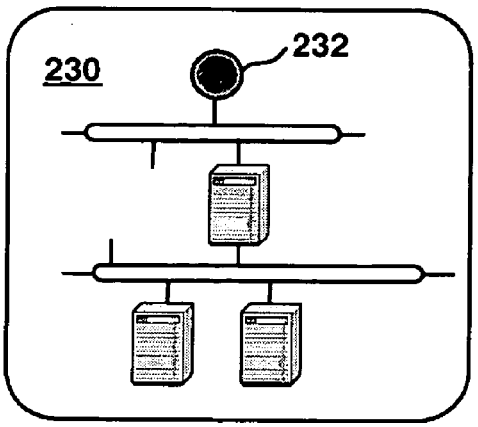

The mirrored visual representations can be used for mirroring farms. The mirrored farms can be used as a part of maintaining applications as well as a part of disaster recovery. FIG. 6 is a block diagram of farms that have been mirrored, according to one embodiment of the present invention. For example, the farms 210 and 220 depicted in FIG. 2 have been mirrored to create farms 610 and 620. Farms 210 and 610 are the same and farms 220 and 620 are the same.

In mirroring farms 210 and 220 to create farms 610 and 620, the secure connections associated with farms 210 and 220 are also mirrored, according to one embodiment. More specifically, a secure connection between farms 210, 220, 610, and 620 is automatically established by allocating a single subnet, for example by the connection creator 460, that is associated with connection ends 214, 222, 614, and 622 by the connection associator 470. Optionally, the mirrored farms could be connected via two mirrored connections, where farm 210 and 220 share one subnet associated with connection ends 214 and 222, while farm 610 and 620 share a second subnet associated with connection ends 614 and 622. Similarly, farm 610 can be securely connected to farms 220 and 620. More specifically, a secure connection between farm 610 and farms 220 and 620 has one end associated with farm 610 and two ends associated respectively with farms 220 and 620.

In so doing, one or more farms can be taken down for maintenance and the application associated with the farms can continue to execute. For example, farm 210 can be taken down for maintenance and the application can continue to execute on farm 610 or vice versa. Similar maintenance processing can be performed with farms 220 and 620.

Just as an application can continue to execute even when a farm is taken down for maintenance, so can an application continue to execute even when a farm fails to operate. The farm may fail due to a disaster and the mirrored farms can be used as a part of recovering from the disaster. Thus, the application can run more reliably. For example, if either farms 610 or 620 fail, the application can continue to execute respectively on farms 210 or 220 via a single subnet (automatically allocated by the connection creator 460) that is associated with the connection ends 224, 232, 624 by the connection associator 470. Similarly, if either farms 210 or 220 fail, the application can continue to execute respectively on farms 610 or 620.

The ends of a secure connection associated with farms 220 and 620 both securely connect with farm 230, according to another embodiment.

It should be noted, that by using visual representations of farms, visual representations of secure connections, or a development tool 400 to create the visual representations, farms and secure connections can be mirrored easily. Further, farms are easy to mirror since a utility controller can use the visual representations to create farms and the secure connections between the farms.

OPERATIONAL EXAMPLES

Figure 7:
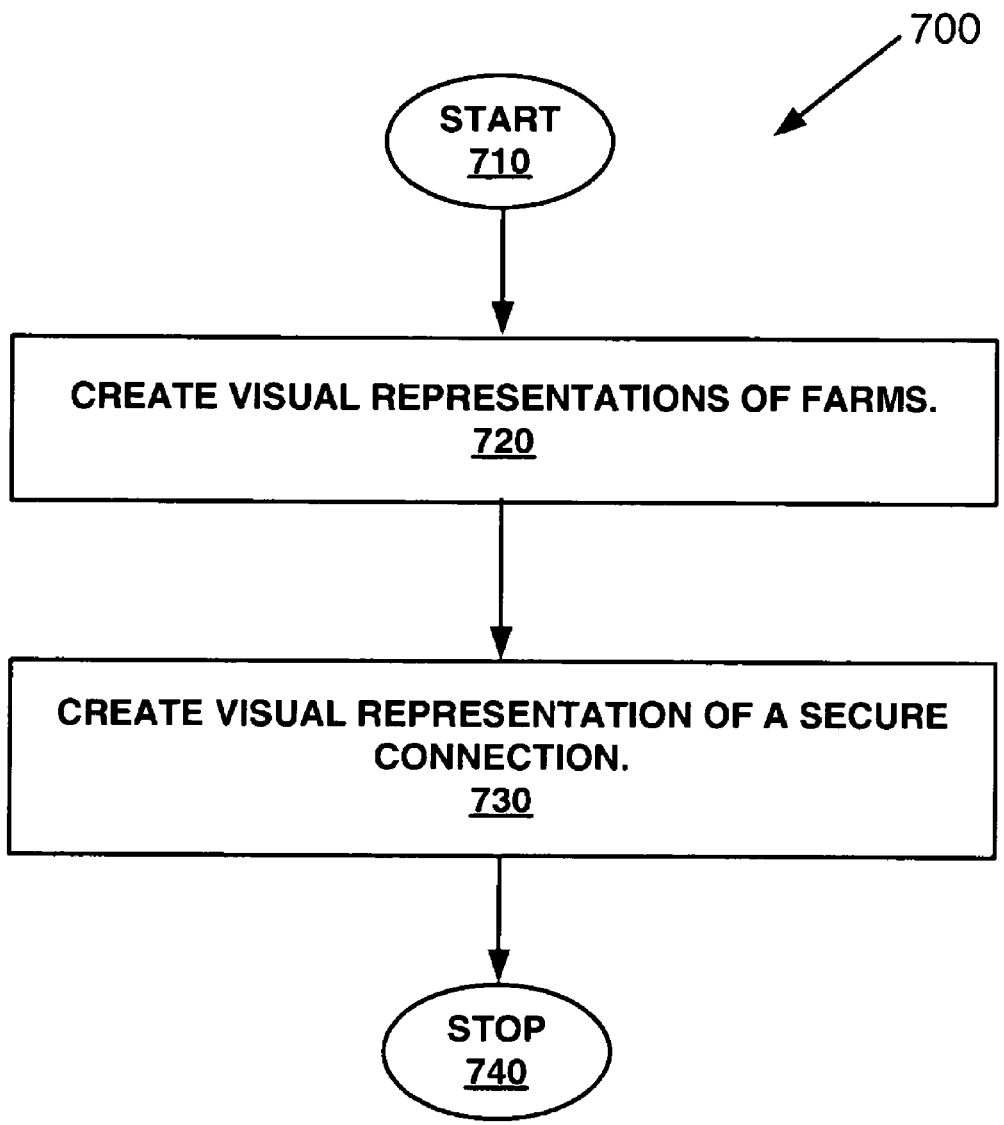
FIG. 7 depicts a flowchart for providing a development tool for creating visual representations of farms that enables securely connecting the farms, according to embodiments of the present invention.
Figure 8:
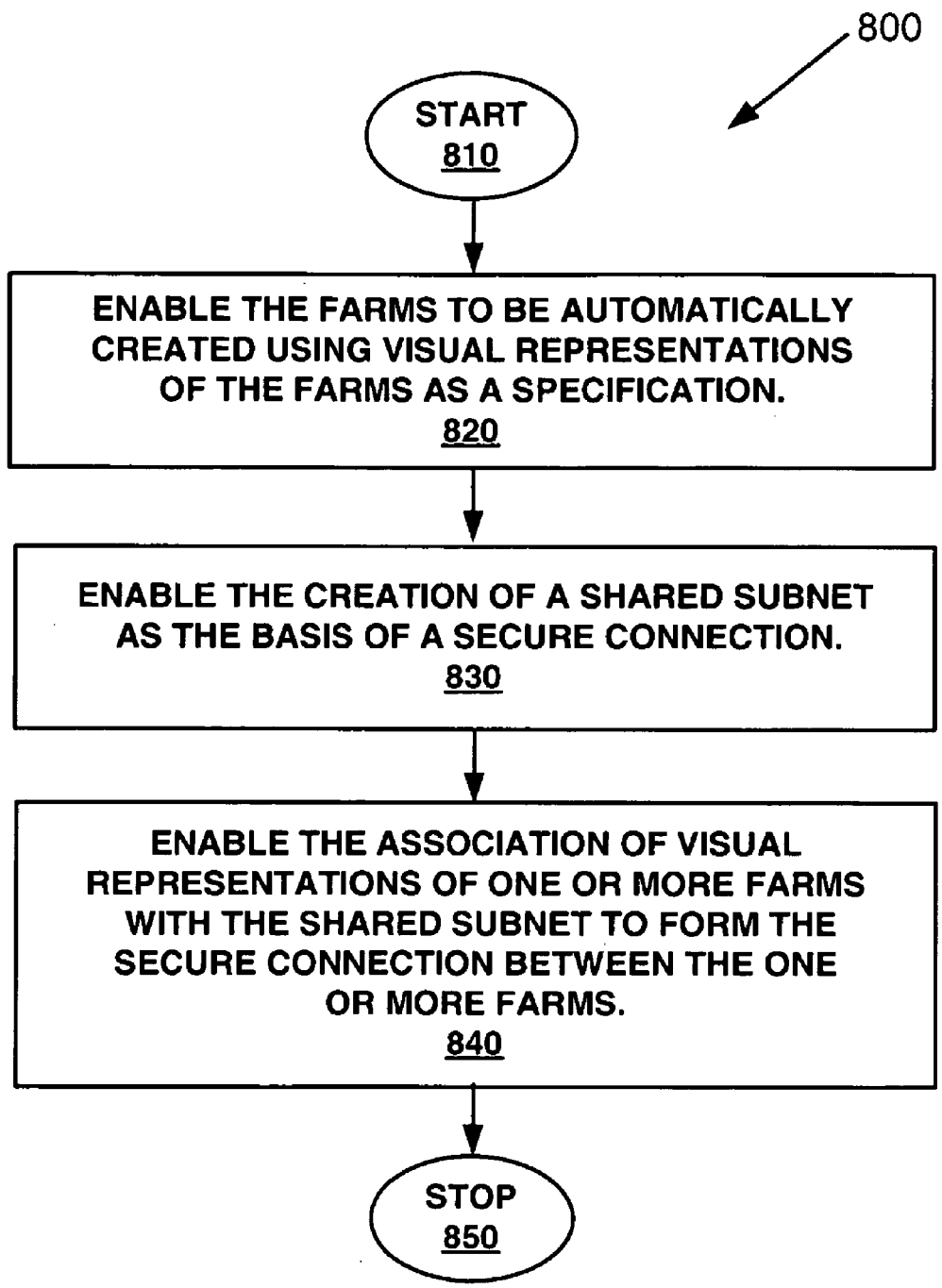
FIG. 8 depicts a flowchart of a method for automatic creation of secure connections between segmented resource farms in a utility computing environment, according to embodiments of the present invention.

FIG. 7 depicts a flowchart 700 for providing a development tool for creating visual representations of farms that enables securely connecting the farms, according to embodiments of the present invention. Further, FIG. 8 depicts a flowchart 800 of a method for automatic creation of secure connections between segmented resource farms in a utility computing environment, according to embodiments of the present invention. Although specific steps are disclosed in flowcharts 700, 800, such steps are exemplary. That is, embodiments of the present invention are well suited to performing various other steps or variations of the steps recited in flowcharts 700, 800. It is appreciated that the steps in flowcharts 700, 800 may be performed in an order different than presented, and that not all of the steps in flowcharts 700, 800 may be performed. All of, or a portion of, the embodiments described by flowcharts 700, 800 can be implemented using computer-readable and computer-executable instructions which reside, for example, in computer-usable media of a computer system or like device.

As described above, certain processes and steps of the present invention are realized, in one embodiment, as a series of instructions (e.g., software program) that reside within computer readable memory (e.g., computer readable storage medium) of a computer system and are executed by the of the computer system. When executed, the instructions cause the computer system to implement the functionality of the present invention as described below.

The process begins at step 710.

In step 720, creating visual representations of farms, according to embodiments of the present invention. For example, an application designer designs visual representations of farms and visual representations of secure connections. More specifically, the application designer analyzes the needs of an application system, such as an application system that would be executed on a conventional farm 100 depicted in FIG. 1, and determines how to break the conventional farm into smaller farms that can be securely connected, such as that depicted in FIG. 2, according to embodiments described herein. After considering administration requirements for all of the parts associated with an application, the application designer may divide the application system into further smaller farms, according to another embodiment. The application designer uses a farm editor 410 associated with the development tool 400 to enter the visual representations of farms, according to one embodiment.

The application developer can enter the visual representation of the farms into the development tool 400 for example using a user interface, as described herein. A farm editor 410 receives the information that the application developer entered and creates visual representations of farms, according to one embodiment. For example, referring to FIGS. 3A and 3B, the farm editor 410 can receive information indicating the application designer wanted to associate resources "pubsubnet1," "webfirewall," "webnet," "web1," and "subnet1" with a farm 300A (FIG. 3A) and information indicating how the user wanted the resources connected. The farm editor 410 can use the received information to create a visual representation of farm 300A, as depicted in FIG. 3A. Similar processing can be used to create visual representation of a farm 300B as depicted in FIG. 3B.

In step 730, a visual representation of a secure connection, according to one embodiment. For example, the application designer uses a connection definer 420 to create visual representations of ends of a secure connection, according to one embodiment. For example, the connection definer 420 can receive information indicating that the application designer caused the tunnel icon to be dragged and dropped onto a screen associated with the development tool 400. Further, the connection definer 420 can receive information indicating that the application designer associated the name "subnet1" (FIG. 3A) with the visual representation of the secure connection, such as the tunnel icon for "subnet1." The connection definer 420 uses the received information to create the visual representations of the secure connection as represented by the tunnel icons "subnet1" depicted on FIG. 3A or FIG. 3B.

According to another embodiment, the connection definer 420 can be used to associate an access list with each end of a visual representation of a secure connection, as already described herein.

The process stops at step 740

As already stated, the visual representations of the farms can be stored in a repository. The development tool 400 can enable the creation of visual representations of farms from scratch or by using a repository as already described herein. The visual representations of farms that were created from scratch or obtained from a repository can be used to construct new visual representations of farms that specify networked resources for each layer associated with an application. These newly created visual representations can also be stored in a repository.

As described in steps 710-740, a specification for a full application system can be defined, according to one embodiment. As part of defining a full application system the application designer can replicate visual representations of farms, which will result in mirrored farms, as already described herein.

The visual representations of the farms and the visual representations of the secure connections that describe the full application system can be submitted to a utility controller 440, as already described herein. The utility controller 440 can use the visual representations to create the farms and the secure connections (e.g., configure and deploy the farms), according to embodiments described herein.

FIG. 8 depicts a flowchart 800 of a method for automatic creation of secure connections between segmented resource farms in a utility computing environment, according to one embodiment.

The process begins at step 810.

In step 820, automatic creation of farms using visual representations of farms as a specification is enabled, according to embodiments of the present invention. For example, the farm creator 450 associated with the utility controller 440 can use the visual representations to determine what resources to obtain from a pool of resources and then use those resources to create the farms and the connections between the farms (also commonly referred to as assigning resources to a farm, deploying resources, or deploying farms), according to another embodiment.

More specifically, the farm creator 450 can use the visual representations of farms, such as those depicted in FIGS. 2, 3A and 3B, to determine how to create farms. For example, a utility controller can use the visual representations depicted in FIG. 3A to determine that resources (as represented "pubsubnet1," "webfirewall," "webnet," "web1") are to be assigned to farm 300A and to determine that "pubsubnet1" is connected to "webfirewall," that "webfirewall" is connected to "webnet," that "webnet" is connected to "web1," and "web1" is connected to "subnet1." The farm creator 450 can use similar processing to create farm 300B using the visual representations ("subnet1," "appfirewall," "appnet," "app1") depicted in FIG. 3B.

In step 830, the creation of a shared subnet as the basis of a secure connection is enabled, according to one embodiment. For example, the connection creator 460 can use a visual representation of a secure connection, such as the ends of the secure connection "subnet1" to create the shared subnet "subnet1" where one end of the secure connection "subnet1" is depicted on FIG. 3A and the other end of the secure connection "subnet1" is depicted on FIG. 3B.

In step 840, the association of visual representations of farms with the shared subnet to form the secure connection between the farms is enabled, according to embodiments of the present invention. For example, the connection associator 470 associated with the utility controller 450 uses identifiers, such as subnet name "subnet1," associated with secure connections to determine what farms are to be securely connected to each other, as already described herein, according to one embodiment. For example, the connection associator 470 can determine the shared subnet "subnet1" is associated with both the visual representations of farm 300A and 300B and therefore the shared subnet "subnet1" should be used to form the secure connection between farm 300A and 300B.

The process stops at step 850.

Further, the connection associator 470 associated with the utility controller 440 uses access lists associated with the secure connections to determine whether the secure connections can be established, as already described herein, according to another embodiment.

As already stated, access lists are used as a part of determining whether to establish a secure connection between farms, according to one embodiment. Further, identifiers, such as subnet names, can be used in determining whether to establish a secure connection between farms. The following illustration shall refer to farms 300A, 300b and the tunnel icon for subnet 1 (referring to FIGS. 3A and 3B). Also for the purposes of illustration, assume that David administers farm 300A, Cheryl administers farm 300B, and they (David, Cheryl) have configured subnet 1 to give each other access to each other's farms 300A, 300B, according to embodiments described herein. Also assume that administrator John administers a farm 3 (not shown) but John has not been granted access to farm 300A and farm 300B.

In this illustration, the utility controller 440 searches all visual representations of farms to find identifiers for visual representations of secure connections. More specifically in this illustration, the utility controller 440 would examine visual representations of farm 300A and farm 300B to see if they have visual representations of secure connections. The utility controller 440 would find that farm 300A and farm 300B shared subnet 1 but did not share subnet 2.

If the farms do not have a subnet in common, such as subnet 2, then a network subnet is allocated and owned by the farm it is associated with, which in this case would be farm 300B. Further, subnet 2 would be sharable with other farms.

A determination is made as to whether the access lists associated with a particular secure connection are the same, according to another embodiment. For example, if the access list associated with subnet 1 for farm 300A grants access to Cheryl and David and if the access list associated with subnet 1 for farm 300B also grants access to Cheryl and David, then the secure connection between farm 300A and farm 300B is established. Further, David and Cheryl can agree to configure their respective access lists with other administrators. For example, if both David and Cheryl configure their respective access lists to also include Michael then their respective access lists would both include David, Cheryl and Michael and the secure connection between farm 300A and farm 300B would be established.

However, if the access lists for subnet 1 for either farm 300A or farm 300B is different, then the secure connection between farm 300A and farm 300B is not established, according to another embodiment. For example, if the access list for subnet 1 for farm 300A included Cheryl, David, and John, but the access list for subnet 1 for farm 300B included only Cheryl and David, then the secure connection would not be established.

Another embodiment provides for an engineer to create a development tool, for example by coding it, designing it, among other things, so that the development tool that can be used to create a visual representation of farms 720, to create a visual representation of a secure connection 730, thus, enabling the creation of the farms 820, enabling the creation of the secure connection 830, and enabling the association of the visual representation of the farm with the secure connection 840.

According to one embodiment, the utility controller proceeds to search all of the visual representations of farms and determines whether to establish or whether not to establish secure connections based on embodiments described herein.

CONCLUSION

Although there are prior art development tools for creating visual representations of farms, these prior art development tools require additional devices that add cost and network resources that decrease performance in order for a utility controller to securely connect the farms. For example, prior art solutions require expensive encryption devices in order to securely connect farms. In contrast, embodiments of the present invention provide secure connections using a shared subnet which provides optimal performance and reduced cost.

What is claimed is:

1. A method of automatic creation of secure connections between segmented resource farms in a utility computing environment, the method comprising:
    automatically creating farms using visual representations of the farms designed by respective administrators as a specification, wherein each of the farms comprises information technology resources;
    creating a shared subnet as a basis of a secure connection;
    associating the visual representations of the farms with the shared subnet to form the secure connection between the farms; and
    associating one or more access lists with the visual representations of the farms,
    wherein the respective administrators that designed the visual representations of the farms authorize that the secure connection can be established between the farms while not authorizing other farms, which are designed by other administrators, to connect through the secure connection by specifying the one or more access lists,
    wherein the automatically creating of the farms using the visual representations of the farms as the specification further comprises using visual representations of farms that were created by a development tool to enable the farms to be automatically created, and
    wherein the creating of the shared subnet as the basis of the secure connection further comprises using visual representations of ends of the secure connection that were created by the development tool to enable the creation of the secure connection.

2. The method as recited in claim 1, wherein the associating of the visual representations of the farms with the shared subnet to form the secure connection between the farms further comprises:
    using visual representations of ends of a tunnel to form the secure connection between the farms.

3. The method as recited in claim 1, wherein the automatically creating of the farms using the visual representations of the farms as the specification further comprises:
    using visual representations of farms that are stored in a repository to enable the farms to be automatically created.

4. The method as recited in claim 1, wherein the automatically creating of the farms using the visual representations of the farms as the specification further comprises:
    using subdivisions of another farm to enable the farms to be automatically created.

5. The method as recited in claim 1, wherein the automatically creating of the farms using the visual representations of the farms as the specification further comprises:
    using a mirror image of another farm to enable a particular farm to be automatically created.

6. The method as recited in claim 1, wherein the same shared subnet name is associated with all of the ends of the secure connection.

7. The method as recited in claim 1, further comprising:
    determining whether the secure connection can be established based on the one or more access lists, wherein the secure connection is established as a part of creating the farms that the secure connection connects.

8. An apparatus for automatic creation of secure connections between segmented resource farms in a utility computing environment, the apparatus comprising:
    a processor for executing instructions;
    a computer readable storage medium including the instructions that the processor executes, wherein the instructions implement:
        a farm creator configured for automatically creating farms using visual representations of the farms designed by respective administrators as a specification, wherein each of the farms comprises information technology resources;
        a connection creator configured for creating a shared subnet as a basis of a secure connection; and
        a connection associator configured for associating the visual representations of the farms with the shared subnet to form the secure connection between the farms, wherein the connection creator is further configured for enabling association of one or more access lists with the secure connection, wherein the one or more access lists are specified by the respective administrators that designed the visual representations of the farms to authorize that the secure connection can be established between the farms while not authorizing other farms, which are designed by other administrators, to connect through the secure connection, wherein the connection creator is further configured for enabling determination of whether the secure connection can be established based on the one or more access lists, wherein the connection creator uses the visual representations of the farms that were created by a development tool to automatically create the farms, and wherein the connection associator uses visual representations of ends of the secure connection that were created by the development tool to create the secure connection.

9. The apparatus of claim 8, wherein the connection associator associates all of the ends of a visual representation of the secure connection that have the same subnet.

10. The apparatus of claim 8, wherein the connection creator uses visual representations of farms that are stored in a repository to enable the farms to be automatically created.

11. The apparatus of claim 8, wherein the connection creator uses subdivisions of another farm to enable the farms to be automatically created.

12. The apparatus of claim 8, wherein the connection creator uses a mirror image of another farm to enable a particular farm to be automatically created.

13. The apparatus of claim 8, wherein the same shared subnet name is associated with all of the ends of the secure connection.

14. The apparatus of claim 8, further comprising:
the connection associator configured for determining whether the secure connection can be associated with the shared subnet based on the one or more access lists, wherein the secure connection is associated with the shared subnet as a part of creating the farms that the secure connection connects.

15. A computer readable storage medium having computer-readable program code stored thereon, which when executed by a computer system performs a method of automatic creation of secure connections between segmented resource farms in a utility computing environment, the method comprising:
automatically creating farms using visual representations of the farms designed by respective administrators as a specification, wherein each of the farms comprises information technology resources;
creating a shared subnet as a basis of a secure connection;
associating the visual representations of the farms with the shared subnet to form the secure connection between the farms; and
associating one or more access lists with the visual representations of the farms,
wherein the respective administrators that designed the visual representations of the farms authorize that the secure connection can be established between the farms while not authorizing other farms, which are designed by other administrators, to connect through the secure connection by specifying the one or more access lists,
wherein the automatically creating of the farms using the visual representations of the farms as the specification further comprises using visual representations of farms that were created by a development tool to enable the farms to be automatically created, and
wherein the creating of the shared subnet as the basis of the secure connection further comprises using visual representations of ends of the secure connection that were created by the development tool to enable the creation of the secure connection.

16. The computer readable storage medium of claim 15, wherein the associating of the visual representations of the farms with the shared subnet to form the secure connection between the farms further comprises:
using visual representations of ends of a tunnel to form the secure connection between the farms.

17. The computer readable storage medium of claim 15, wherein the automatically creating of the farms using the visual representations of the farms as the specification further comprises:
using visual representations of farms that are stored in a repository to enable the farms to be automatically created.

18. The computer readable storage medium of claim 15, wherein the automatically creating of the farms using the visual representations of the farms as the specification further comprises: using subdivisions of another farm to enable the farms to be automatically created.

19. The computer readable storage medium of claim 15, wherein the automatically creating of the farms using the visual representations of the farms as the specification further comprises:
using a mirror image of another farm to enable a particular farm to be automatically created.

20. The computer readable storage medium of claim 15, wherein the same shared subnet name is associated with all of the ends of the secure connection.

21. A data center comprising:
a plurality of information technology (IT) resources and connections coupled with the plurality of IT resources, with each of the plurality of IT resources represented in a machine-readable map, wherein at least one of the IT resources includes hardware;
a plurality of farms that were automatically created using visual representations of the farms designed by respective administrators as a specification for the creation of the farms, wherein each of the farms comprises IT resources; and
a shared subnet that was created to provide a basis of a secure connection between the farms,
wherein visual representations of the farms were associated with the shared subnet to form the secure connection between the farms,
wherein one or more access lists are associated with the visual representations of the farms,
wherein the respective administrators that designed the visual representations of the farms authorize that the secure connection can be established between the farms while not authorizing other farms designed by other administrators to connect through the secure connection by specifying the one or more access lists,
wherein the one or more access lists, which are associated with the farms, are used to determine which administrators can access the farms,
wherein the automatically creating of the farms using the visual representations of the farms as the specification further comprises using visual representations of farms that were created by a development tool to enable the farms to be automatically created; and wherein the creating of the shared subnet as the basis of the secure connection further comprises using visual representations of ends of the secure connection that were created by the development tool to enable the creation of the secure connection.

* * * * *